United States Patent [19]

Bartholow

[11] Patent Number: 4,677,428

[45] Date of Patent: Jun. 30, 1987

[54] CORDLESS LIGHT PEN

[75] Inventor: Paul A. Bartholow, St. Louis Park, Minn.

[73] Assignee: Hei, Inc., Victoria, Minn.

[21] Appl. No.: 742,399

[22] Filed: Jun. 7, 1985

[51] Int. Cl.$^4$ .............................................. G09G 1/00
[52] U.S. Cl. .................................. 340/708; 455/603; 455/617
[58] Field of Search ................. 455/617, 603; 340/707, 340/708

[56] References Cited

U.S. PATENT DOCUMENTS

| 4,262,366 | 4/1981 | Eumurian | 455/617 |
| 4,263,592 | 4/1981 | Takahashi | 340/707 |
| 4,276,656 | 6/1981 | Petryk, Jr. | 455/617 |
| 4,454,417 | 6/1984 | May | 340/707 |
| 4,578,674 | 3/1986 | Baker et al. | 455/603 |
| 4,596,050 | 6/1986 | Rogers | 455/617 |

Primary Examiner—Marshall M. Curtis
Attorney, Agent, or Firm—Orrin M. Haugen; Thomas J. Nikolai

[57] ABSTRACT

A cordless light pen for use with a cathode ray tube display screen as a data input for a digital computer. Contained within the exterior barrel of the pen is a depressible tip having a core made from a plastic which has been treated and whose index of refraction causes light entering in a direction parallel to the longitudinal axis of the core to pass through. The other end of the tip is operatively disposed relative to a light sensor. Also contained within the barrel of the cordless pen is a circuit card containing circuitry for amplifying, filtering and shaping the signals from the light sensor and to discriminate between signals due to the CRT sweep in the field of view of the tip and ambient noise. The so-called "hits" occasioned by the passage of the CRT beam past the tip member when it is depressed cause an IR LED to be energized to produce a directed beam of IR energy. The IR energy is transmitted to a receiver positioned to detect it, provided the light pen is held on the face of the CRT screen. The receiver output is fed to the digital computer driving the CRT display causing the dot and line counts (refresh address coordinates) to be latched. With this latched information, the computer is able to determine the coordinate location on the face of the CRT screen where the hit occurred and is made to carry out a preprogrammed function as a result of the detected hit. The receiver is designed to provide a high degree of noise masking.

8 Claims, 6 Drawing Figures

CORDLESS LIGHT PEN

BACKGROUND OF THE INVENTION

I. Field of the Invention

This invention relates generally to computer data input devices, and more particularly to a cordless light pen system for inputting data to a computer corresponding to graphic patterns presented on the face of a cathode ray tube display.

II. Discussion of the Prior Art

In the field of computer-aided design or in software development, the designer or programmer commonly works with a keyboard and a graphics display terminal to form machine part patterns or programming data on the screen of a cathode ray tube. During the design procedure, it becomes necessary to send messages to a computer as to the dimensions and shapes of the object being designed or, in the case of software, to indicate a selected menu item or the like. The computer can then, in turn, prepare a tape which may later be used by a tape reader-controlled machine tool to produce the part. Similarly, in the case of software development, programmers often have a need to communicate interactively with data presented on the CRT monitor.

Because presenting data to a computer from a keyboard in certain applications is a time consuming approach, so-called "light pens" have been developed for facilitating the data entry operations.

As those skilled in the art understanding, in a CRT, the electron beam generally has its Home position in the upper left corner of the screen, and time varying voltages are applied to the deflection plates or to the deflection magnets to cause the electron beam to sweep from left to right until a horizontal sync pulse is encountered. At this time, the beam is blanked and quickly returns to the left edge of the screen just below the starting point of the line it had just previously traced. This continues until a vertical sync pulse is encountered, generally when the sweep is at the lower left corner of the screen. The vertical sync pulse defines the end of a frame. Upon encountering the vertical sync pulse, the beam is again blanked and moves rapidly to the starting point at the upper left corner of the screen where the sequence is again repeated. In digital display apparatus, each horizontal line consists of a series of dots called picture elements or pixels. In a typical display, each line may consist of 480 pixels and there may be 240 lines for each frame with the sweep speed being such that 60 frames are traced each second.

The redrawing of the CRT screen is called refresh. A special address calls out the coordinates which tell the beam where to move. This same refresh addressing also affects addressing of the memory locations which store the data specifying color and dot information.

Whether a given dot on the screen will be bright or dark depends upon the contents of a random access memory forming a part of the character generating circuitry. Associated with the random access memory are addessing circuits consisting of a vertical counter and a horizontal counter, the counters being appropriately driven by a clock circuit termed the "dot clock". Thus, as the horizontal and vertical counters are advanced, the contents of the RAM are sequentially read out and used to either blank or unblank the electron beam, depending upon the information stored in the RAM. As the scanning line refreshes a given point on the phosphor during its travel across the screen, that point brightens momentarily.

When a light pen is positioned adjacent the CRT screen, this momentary increase in brightness of the light emitted by the screen's phosphor within the light pen's view of field causes a change in signal current from the photo-detector within the light pen and this signal is amplified, filtered and applied to a comparator where it is compared against a predetermined threshold voltage. If the threshold is exceeded, a "hit" pulse is produced. This hit pulse latches the current screen refresh address in a register. Thus, knowing the address where the hit occurred, the computer may also determine the coordinate location of the pen on the face of the screen.

In the prior art systems, the "hit" signals are fed through an electrical cord coupling the light pen to an input port of a computer or computer interface device and may cause a time or count value to be captured in a snap-shot register within the computer.

One reason why light pens have not been widely adopted as a user/monitor interface device has been due to some extent to operator fatigue. When using the light pen, the user must position the point of the light pen against a usually vertical screen and without any form of arm support. The weight of the pen, its cord and the spring tension of the cord adds to this operator fatigue and thus detracts from its value as a pointer.

The present invention is considered to be an improvement over the prior art in that it obviates the fatigue-inducing cord. Rather than sending electrical signals from the light pen to the computer by way of the conductors in the cord, the same information is transmitted from the light pen to a receiver connected to the computer by light energy. In addition, the design of the light pen of the present invention has been engineered to reduce its weight while still having the pen easy to grasp and easy to position and operate.

The cordless light pen of the present invention also provides certain other benefits over prior art light pens which are coupled by a cord to the computer terminal with which they are used. More specifically, a light pen having a cord is often subject to electrostatic discharge (ESD), either from an operator upon first picking up the light pen or from the charge which may be present on the CRT screen itself. Such ESD can cause the computer to interpret the discharge impulse as a valid "hit" signal or, alternatively, the static charge itself may travel through the cable and damage sensitive components in the computer. By eliminating the need for the cord, both of these potential problems are eliminated.

In addition to curing the ESD problem, the cordless light pen of the present invention also removes problems occasioned by electromagnetic interference (EMI). The emission of EMI by electronics systems is now tightly regulated by federal law. Computers with high frequency clocks are notorious for the generation of EMI and, hence, their enclosures must be carefully shielded and other noise reducing measures must be taken to minimize these emissions from CRT terminals. The long cable of the prior art light pens frequently act as antennas, causing a terminal to fail the applicable emission standards. By eliminating the cord on the light pen, the federal standards can more readily be met while still allowing a light pen instrument to be used as a data input device with the system.

Finally, simple mechanical unreliability associated with a cable is absent in the cordless light pen system of the present invention. As is well known in the art, cords attached to manipulated objects are subject to many mechanical stresses, torques and other forces. This often leads to breakage of internal conductors and, thus, may frequently cause intermittent faults for total lack of operation.

SUMMARY OF THE INVENTION

The light pen of the present invention comprises an exterior barrel having a detachable cap, and contained within the cap is an infrared light-emitting diode and an aspheric reflector which is designed to direct the infrared light energy back onto a CRT monitor in a cone pattern. Contained within the barrel are one or more battery cells which provide the necessary current for energizing the circuitry contained within the light pen. Also fitted within the barrel is a frame or housing which is adapted to support a ceramic circuit card and a silicon photodiode sensor. The frame is also arranged to slidingly receive a tip member, a portion of which projects outwardly from the proximal end of the barrel. The tip member contains a light-pipe which extends from the distal end thereof and which runs longitudinally toward the silicon diode light sensor. As a part of the circuitry contained on the ceramic card, a pair of magnetic reed switches are positioned so as to cooperate with a bar magnet disposed on a portion of the reciprocally movable tip member. Thus, when the tip member is depressed and pushed into the barrel, the magnet actuates first one switch, turning on the electronic circuitry and then another to ultimately activate the IR transmitting LED. Light energy traveling through the light-pipe of the tip member to the silicon photo-diode will be amplified, filtered, shaped and used to drive the infrared LED contained within the IR transparent end cap. Thus, when the tip of the light pen is pushed up against the face of the CRT to depress the tip into the barrel of the light pen, a switch circuit is activated which will result in a light signal picked up by the light-pipe causing the LED in the end cap to radiate IR energy, predominately in a direction indicated by the mirrored surface of the aspheric reflector also provided in the end cap.

Suitably mounted on the CRT monitor with which the light pen of the present invention is used is an IR light receiver which may, in its simplest form, consist of one or more semiconductor photo-diodes and associated amplification, wave-shaping, filtering and thresholding circuitry needed to create a TTL compatible logic signal when the silicon photo-diode is receiving IR energy radiated from the light pen. Thus, the "hit" signals are effectively transmitted optically rather than through electrical conductors to the receiver where they are converted to pulse-type signals compatible with the TTL circuitry used in the computer with which the present invention is intended to be used.

OBJECTS

Accordingly, it is a principal object of the present invention to provide a new and improved user/monitor interface of the light pen type.

Another object of the invention is to provide a light pen assembly capable of sending information relating to graphic patterns appearing on the face of a CRT scren to a computer or other utilization device.

Yet another object of the invention is to provide an improved light pen assembly for sending digital information pertaining to graphic patterns appearing on the face of a cathode ray tube screen to a utilization device without requiring an electrical cord extending between the two.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
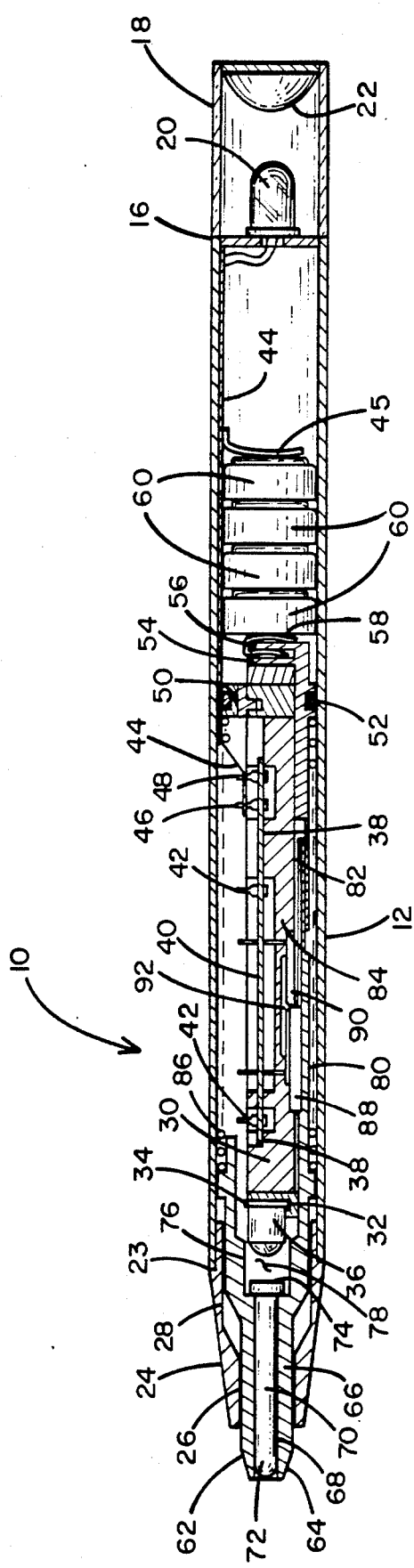
FIG. 1 is a longitudinal cross-sectional drawing showing the structural features of the preferred embodiment.

Referring to FIG. 1, there is shown a longitudinal cross-sectional side view of a preferred embodiment of the invention. The cordless light pen, identified generally by numeral 10, is seen to include an outer tubular barrel 12 which may typically be 6 to 8 inches in length and formed from a suitable metal or plastic. The barrel is provided with a small hole or other detent 14 near its distal end 16 which cooperates with a flexible barb (not shown) on the end cap 18 so that when the barb snaps into the hole, the end cap is held in place. Depression of the bar allows removal of the end cap 18.

Contained within the end cap is a source of radiation such as LED 20 whose output preferably lies in the infrared spectrum. Light in the visible spectrum may be utilized but it tends to be more distracting and cannot be distinguished from ambient sources. The light-emitting diode 20 is fitted within the end cap 18 and the end cap is fabricated from a material which is transparent to the frequency of the radiant energy being emitted by the source 20. Also, positioned within the end cap 18 is an aspheric reflector 22 which is shaped to cause the light or infrared energy impinging thereon to be reflected through the transparent cylindrical side walls of the end cap in a desired pattern. More specifically, when the light pen is being used, the LED 20 points away from the CRT terminal with which it is used. The aspheric mirror redirects the IR energy back onto the CRT monitor in a cone-shaped pattern.

Attached to the left end of the tubular barrel 12 as it is viewed in FIG. 1 is a nose member 24, and the nose member includes an axial bore 26 of a first predetermined diameter intersecting with a counterbore 28 of a somewhat larger diameter. The nose member 24 may be secured to the front end 23 of the barrel by a threaded connection or, alternatively, the nose member 24 may be adhesively fastened to the inside front end portion of the tubular barrel 12.

Contained within the barrel 12 is a frame member 30 which is preferably formed from plastic in a molding operation so as to include various surfaces and recesses for supporting various other components of the assembly yet to be described. For example, proximate the front end of the frame 30 is a generally semicircular notch into which is fitted the base flange 34 of a photo-diode 36. The photo-diode 36 acts as a light sensor or transducer for converting the light energy reaching it to an electrical signal.

The frame also includes a recessed ledge on either side of its generally semi-circular side walls, the ledge being identified by numeral 38. Resting upon the ledge segments is a ceramic substrate 40 which supports a pattern of printed circuitry and active and passive electrical circuit components corresponding to a portion of the schematic diagram of FIG. 2 as supplemented by the circuitry of FIG. 3. The ceramic circuit card 40 is held in position on the frame 30 by a suitable bonding technique, e.g., adhesive. In addition to the active and passive circuit elements on the printed ceramic substrate, a plurality of terminal pins, as at 42, are secured to the ceramic card 40 so that operating potentials can be applied to the circuit and detected signals can be taken therefrom and applied to the transmitting photo-emitter 20. In this regard, numeral 44 identifies a flexible printed circuit which joins the output terminal pins 46 and 48 to the photo-emitter LED 20. Toward the rightmost end of the frame number 30 when viewed as in FIG. 1 is an annular recess or groove 50 containing the rubber O-ring which cooperates with the inside wall of the barrel 12 to effectively hold the frame 30 within the barrel and to provide shock protection to the frame 30 and to the components supported by it.

At the extreme rightmost end of the frame 30 are first and second spaced-apart, transversely-extending end walls 54 and 56. Fitted between the walls 54 and 56 is a U-shaped conductive spring element 58, which is arranged to make contact with a plurality of battery cells 60. Element 58 is designed to be too large to pick up the battery terminal if the battery polarity is inadvertently reversed. These cells may be contained within a plastic sleeve (not shown) whose outside diameter is slightly less than the inside diameter of the barrel 12.

Fitted within the bore 26 of the nose piece 24 is a tip member 62, which includes a frusto conical tip segment 64 integrally joined to a cylindrical segment 66 which is suitably dimensioned to freely slide within the bore 26 of the nose piece 24. The tip member 62 includes a longitudinal bore 68 into which is fitted a lensed fiber-optic rod or light-pipe 70. The light-pipe 70 is made from a suitable light transmissive plastic. The surface of the light-pipe 70 is grooved over its length by a series of transverse grooves and is blackened to absorb light which enters the lensed end of the light-pipe 70 but which is not parallel to the axis of the light-pipe. The grooves and blackening keeps the area of the screen or field of view of the light-pipe to a minimum, which is a desirable characteristic in any light pen. As can be seen from FIG. 1, the posterior end 74 extends outward from the bore 68 and is situated within a counterbore 76 defining a cylindrical chamber 78 whose inside diameter is sufficiently large to freely slip over the photo-sensor 36 held in the frame 30.

Also integrally formed with the tip member 62 is an elongated paddle or bar 80 whose right end 82 (FIG. 1) is arranged to fit within a slot formed through an arcuate shoulder 84 formed in the frame 30. Thus, the end 82 is reciprocally slidable relative to the frame 30 but the tip member 62 is normally urged outwardly of the nose 24 by means of a compression spring 86 which presses at its left end against a shoulder formed on the tip member 62 and its right end against a shoulder formed on the frame member 30.

Attached to the paddle portion 80 of the tip member 62 is a permanent magnet 88 which is arranged to move longitudinally back-and-forth when the tip member 62 is first pressed against a solid object and subsequently released. Straddling the paddle 80 on either side thereof are first and second magnetic reed swiches 90 which fit into rounded cavities 92 formed in the frame 30. The positioning of the magnet 88 relative to the reed switches 90 is such that the reed switches are both opened when the tip member 62 is in its fully extended position but are closed sequentially by the magnetic field of the permanent magnet 88 when the tip member 62 is forced rearward into the nose 24 against the spring 86. Rather than staggering the position of the glass magnetic reed switches within the barrel, the sequential operation thereof upon movement of the tip member 62 rearward can be accomplished by selecting reed switches which require a different magnetic field intensity to pull in their contacts.

As the tip member 62 moves rightward in FIG. 1, the rightmost end 74 of the light-pipe 70 closely approaches the photo-diode 36 so that the light exiting therefrom impinges directly upon the photo-sensitive material contained within the photo-diode 36.

Figure 4:
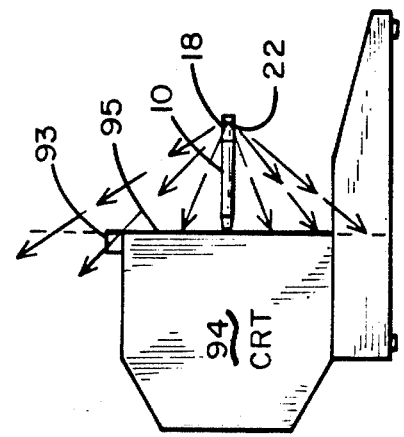
FIG. 4 is a diagram helpful in understanding the optical design of the invention.
Figure 2A:
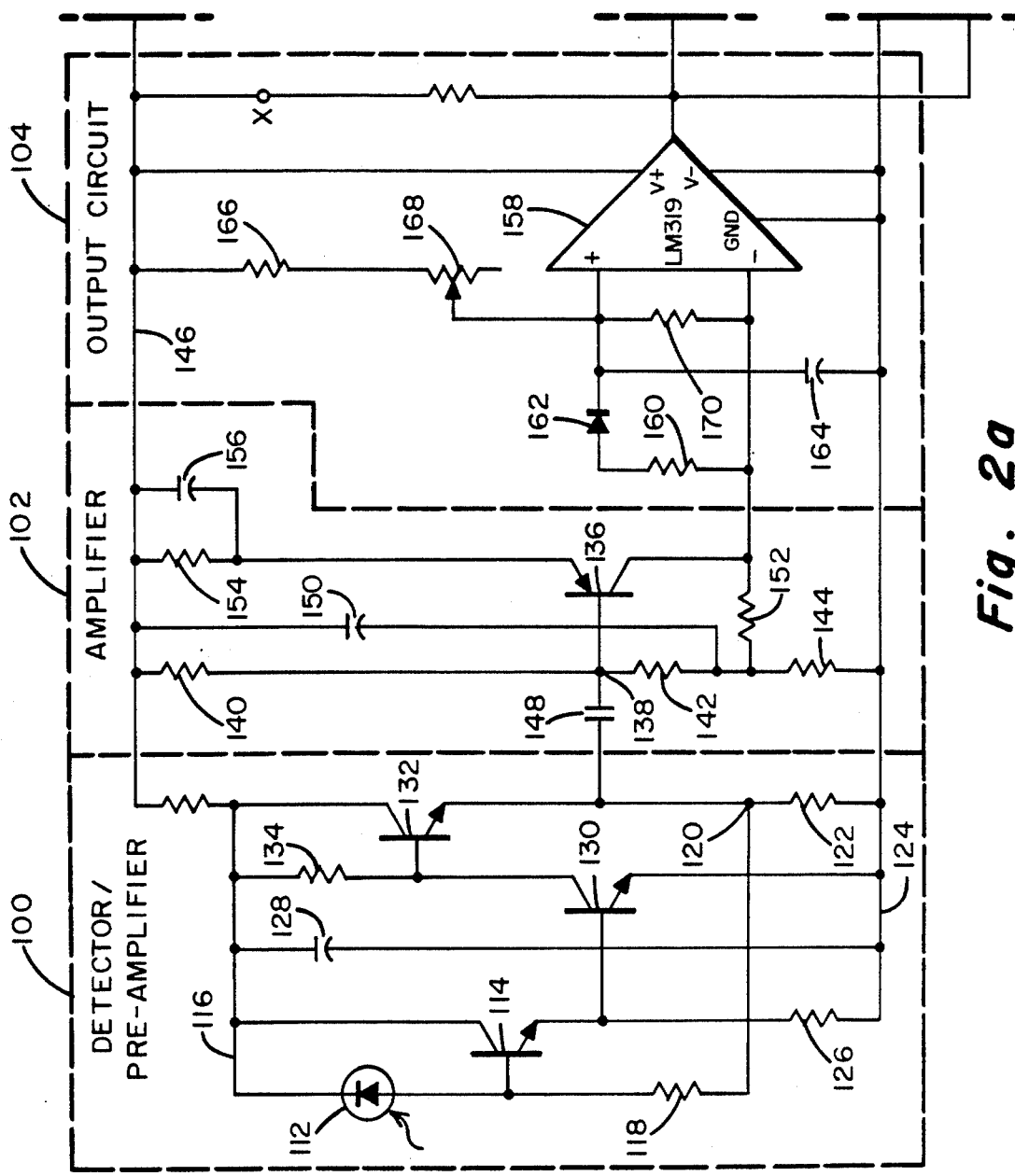
FIGS. 2a, 2b and 2c form an electrical diagram of the circuitry of the receiver with which the light pen of FIG. 1 is used.
Figure 2:
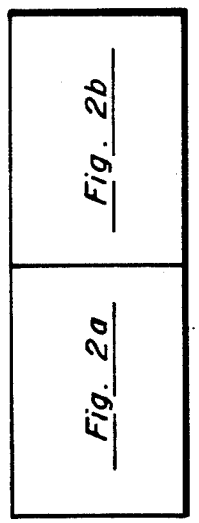
Figure 2B:
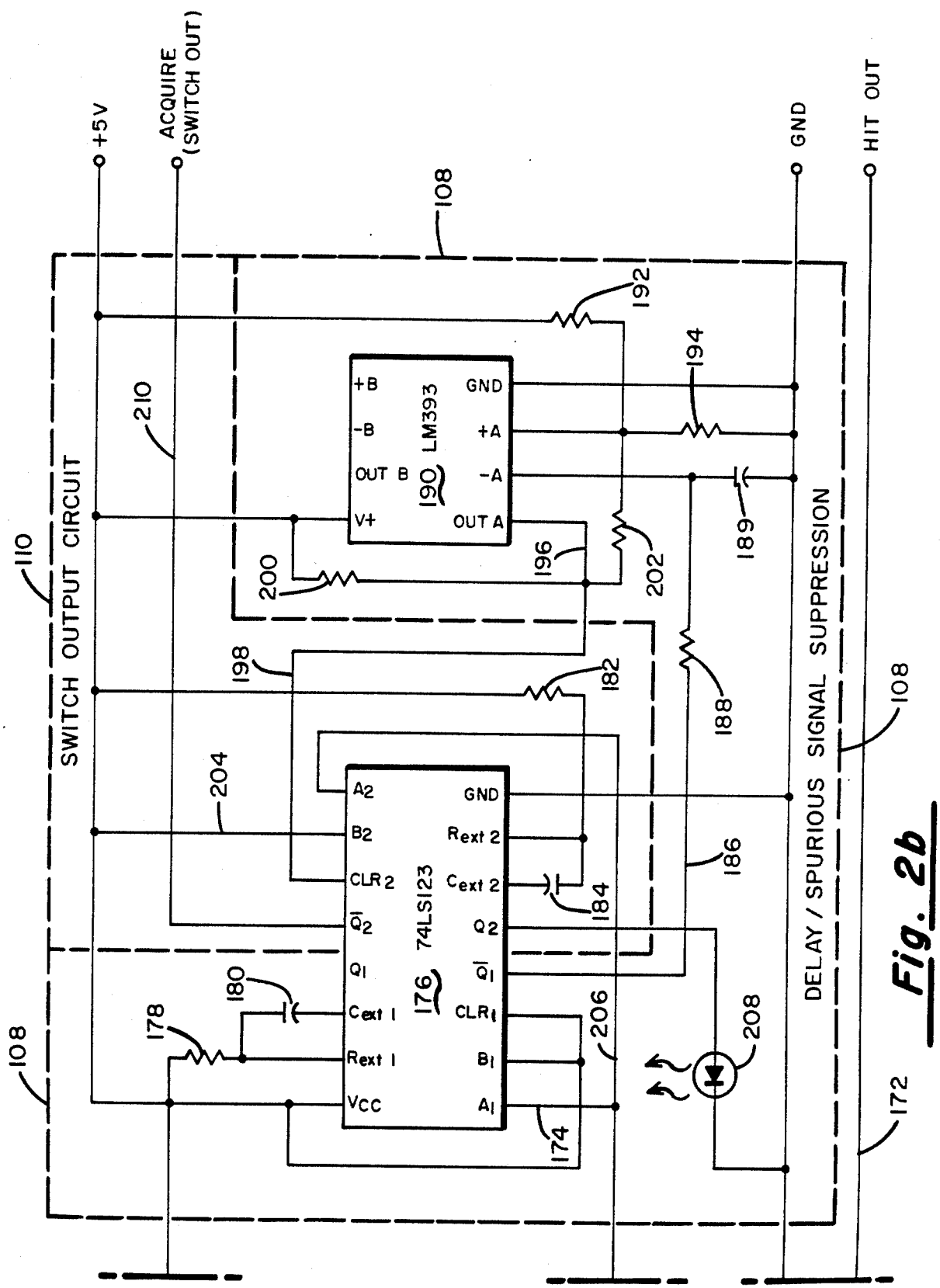

FIG. 2 is a circuit schematic of the receiver circuitry for the cordless light pen comprising the present invention. As is shown in FIG. 4, the receiver 93 is adapted to be mounted on the bezel of the CRT 94 with which the light pen is used and is suitably positioned to view the area of volume traced out by the end portion 18 of the light pen 10 when the device is used. The receiver circuit of FIG. 2 is conveniently divided into functional stages. The circuitry surrounded by broken line box 100 is the detector/pre-amplifier stage, the block 102 surrounds the amplifier stage, and broken line box 104 surrounding the output circuit. The portion of the circuit of FIG. 2 surrounded by the broken line box 108 prevents spurious receiver signals from initiating the "acquire" command to the computer to capture the contents of the horizontal and vertical registers. Finally, block 110 in FIG. 2 surrounds the actual "acquire" or switch output circuit. It is the "acquire" signal that advises the computer that the tip 62 of the light pen is compressed and that the computer can now validly sample for "hits".

Referring to the detector/pre-amplifier, it is seen to include a large surface area photo-diode 112 and preferably includes with it a infrared filter capable of passing only electro-magnetic radiation in the infrared spectrum. The anode of the photo-diode 112 is connected to the control or base electrode of a NPN transistor 114 while its cathode electrode is connected to a positive voltage bus 116. Transistor 110 provides a desired current gain. A resistor 118 is connected to the common junction between the base electrode of the transistor 114 and the anode of the photo-diode 112. The other terminal of the resistor 118 is connected to a junction point 120 and from there through a resistor 122 to a ground bus 124. The emitter electrode of the transistor 114 is coupled through a resistor 126 to the ground bus 124 while the collector electrode of that transistor is tied directly to the positive bus 116. A filter capacitor 128 is connected directly across the positive bus 116 and the ground bus 124.

The pre-amplifier 100 includes two further stages of amplification provided by transistors 130 and 132. Transistor 130 receives its output from the emitter electrode of transistor 114 and has its own emitter tied directly to the ground bus 124. It provides a predetermined voltage gain. Its collector is coupled through the resistor 124 to the positive bus 116. Transistor 132 is included to provide further current gain and receives its output from the collector electrode of the transistor 130 and it, in turn, has its emitter electrode tied to the junction point 120. Its collector is tied directly to the positive bus 116.

The amplifier stage 102 includes a PNP transistor 136 in a common emitter amplifier configuration and the base electrode thereof receives it bias from the node 138 of a voltage divider comprising resistors 140, 142 and 144 which are connected in series between the bus 146 and the ground bus 124. A coupling capacitor 148 couples the output from the pre-amplifier stage 100 to the amplifier stage 102 and serves to remove any 60 Hz baseline shift which may be caused by variations in ambient light reaching the photo-diode 112. A further filter capacitor 150 is coupled between the positive bus 146 and the common junction between the resistors 142 and 144 of the aforementioned voltage divider. This capacitor, like capacitor 128 in the pre-amplifier stage 100, acts as a noise filter.

The collector electrode of the common emitter amplifier 136 is connected through a resistor 152 to the junction point between the voltage divider resistors 142 and 144. The emitter electrode of the PNP transistor 136 is coupled by a bias resistor 154 to the positive bus 146. A bypass capacitor 156 is connected directly in parallel with the bias resistor 154.

The output circuit 104 preferably comprises a Type LM 319 single supply high-speed comparator. Connecting the output of the amplifier stage 102 to the non-inverting input of the comparator 158 is a current pump comprising a series combination of a resistor 160 and a semiconductor diode 162. A capacitor 164 is also connected between the non-inverting input of comparator 158 and the ground bus 124.

The curent pump pumps current into the RC network including compacitor 164 and resistor 170 whenever the light pen amplifier is providing waveforms in response to pulse light. The effect is to maintain the threshold voltage on the comparator 158 above, yet close to, the quiescent level of the amplifier. The threshold is permitted to shift as the amplifier is driven harder. Also, the current pump, working in conjunction with the resistor linking the threshold voltage directly to the amplifier, allows the threshold to closely track the quiescent level of the amplifier, even though the battery voltage departs from its initial potential when they are fresh to their eventual discharge potential. This is important if response time and sensitivity parameters are to remain maximized.

It may also be noted that the output from the common emitter amplifier stage 136 is also tied to the inverting input of the comparator 158. A series combination of a fixed resistor 166, a variable resistor 168 and a further fixed resistor 170 connects the inverting input of the comparator 158 to the positive bus 146. Thus, the comparator 158 has a floating reference allowing the reference to track the quiescent level of the amplifier stage 102 even during shifts occasioned by degradation in battery voltage as the batteries become depleted. It is also to be noted that the quiescent level of the amplifier stage 136 changes in a non-linear fashion as the battery supply voltage varies. The voltage typically goes from about 5.6 volts when the batteries are fresh to about 4.5 volts when the batteries are substantially depleted.

The output from the comparator 158 appearing on line 172 is the so-called "hit" signal which ultimately gets fed to the computer with which the CRT display is being used. In the case of the receiver, the output from the comparator 158 is also applied to a trigger input 174 of a TTL dual retriggerable integrated one-shot circuit 176. An external resistor 178 and an external capacitor 180 establish the astable period for the first of the dual one-shot circuit, while the resistor 182 and the capacitor 184 determine the astable period of the second of the dual one-shot circuits in the chip 176. The low active output of the first one-shot is applied by way of conductor 186 and resistor 188 to the inverting input of the integrated circuit comparator 190. The non-inverting input of the comparator 190 is held at a predetermined reference voltage established by the voltage divider comprising resistors 192 and 194, which are connected in series between the positive bus 146 and the negative ground bus 124.

The output from the comparator 190 is applied via conductors 196 and 198 to the enable input of the second of the dual one-shot circuits contained on the IC chip 176. This output is superimposed on the bias voltage level established by the resistors 200 and 202 which, along with the resistor 194, are connected serially between the positive bus 146 and the ground bus 124. The B input of the second one-shot circuit is held at a high potential by virtue of the connection between it and the positive bus over conductor 204. The input to the low active A input of the second one-shot circuit comes from the output of the comparator 158 over conductor 206. The true output of the second one-shot circuit drives an indicator LED 208 while the complement output of the second one-shot circuit appears on conductor 210 and provides the "acquire" or switch signal to the computer.

Figure 3:
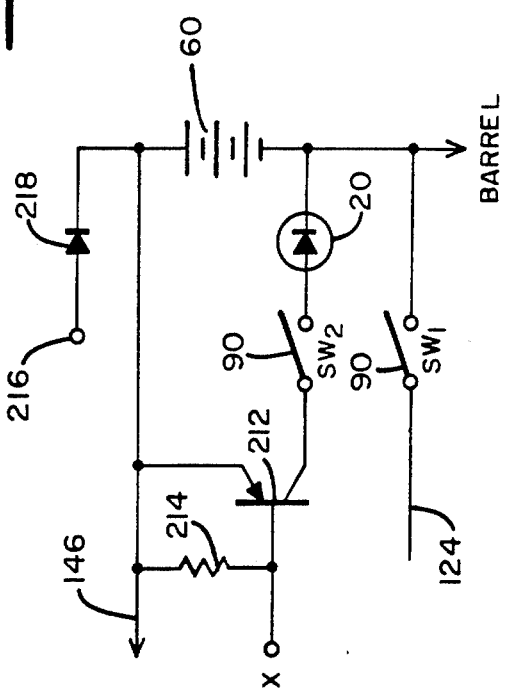
FIG. 3 is a circuit schematic showing the modifications to a portion of the schematic of FIG. 2 used in implementing the light pen.

While the circuit of FIG. 2 in is entirety is used to implement the light pen receiver means, the portion surrounded by broken-line boxes 100, 102 and 104 along with the additional circuit of FIG. 3 is used inside the light pen itself. That is say, contained on the ceramic substrate 40 within the barrel of the light pen 10 is the circuitry contained in boxes 100, 102 and 104 of the FIG. 2. Thus, the same circuitry as is used in implementing a portion of the remote receiver circuit may also be used to detect light energy being emitted by the phosphor of the CRT for driving the transmitter LED 20 contained in the end cap 18 of the light pen, when modified by the addition of the circuit of FIG. 3.

In FIG. 3 there is shown the battery cells 60 whose positive terminal is connected to the positive bus 146 and whose negative terminal is connected to the ground which may conveniently be a conductive barrel of the light pen. A first of the two magnetic reed switches 90, labeled SW$_1$, is connected between the barrel of the light pen and the ground bus 124 on the ceramic pc card. A further switching transistor 212 is provided and it has its base or control electrode connected to the point labeled "X" in FIG. 2. A bias resistor 214 is connected between the base electrode of the transistor 212 and the positive bus 146. The emitter electrode of the transistor 212 is also tied to the positive bus while its collector electrode is connected to a first pole of the normally open switch 90, labeled SW$_2$. The other pole of this switch is connected to the transmitting LED 20. Where it is contemplated that rechargeable batteries will be used in the light pen as the energy source 60, a recharging input jack 216 may be provided and that jack is coupled through a rectifying-diode 218 to the positive terminal of the rechargeable battery source 60.

Now that the circuit layout of both the light pen receiver and the light pen transmitter have been set out in detail, consideration will be given to their mode of operation.

In conventional prior art light pens, the instrument provides two signals over the light pen's cord to the computer. The first is the "hit" signal that informs the computer that the pen is in position and detecting light pulses on a frame-by-frame basis as they occur, and the second is the "acquire" signal that advises the computer that it should latch the contents of the horizontal and vertical counters being driven by the dot clock. The circuit in the receiver of the present invention emulates the conventional light pen and, therefore, is also designed to provide both "hit" and "acquire" signals to the computer.

In operation, when the light pen 10 is picked up and its tip 62 is placed against the CRT display screen 95 (FIG. 4) and pressure is applied to compress the spring 86, the end 74 of the light-pipe 72 is brought into close proximity to the photo-sensor 36. At the same time, the magnet 88 is moved rearwardly and into operational proximity to the two magnetic reed switches 90 contained within the frame 30. The magnetic reed switches are positioned or otherwise designed such that $SW_1$ (FIG. 3) makes before $SW_2$. Closure of $SW_1$ applies the voltage from the battery 60 across the positive bus 146 and the ground bus 124 to provide the requisite bias potentials and energizing current for the detector/preamplifier stage 100, the amplifier stage 102 and the output circuit 104, which circuits are disposed on the ceramic pc card 40. When $SW_2$ closes following the energization of the circuit via $SW_1$, the photo-transmitter diode 20 is conditioned to provide IR pulses to the receiver circuit (FIG. 2) within the receiver module 93 (FIG. 4) when a "hit" is detected. Specifically, if the light is positioned so that on successive frames light impulses come into the field of view of the opening in the left end of the nip member 62, the photo-diode 36 will have its impedance reduced, thus providing a shift in the signal applied to the pre-amplifier stage 100. The NPN transistors 114, 130 and 132 provide a corresponding signal which is coupled through the capacitor 148 to the base of the PNP transistor 136 comprising the amplifier 102.

By providing the current pump comprising resistor 160 and the diode 162 and because of the manner in which the bias is applied to the comparator 158 via resistors 166, 168 and 170, the comparator 158 effectively has a floating reference which tracks the quiescent level of the amplifier 136 even during voltage shifts. The variable resistor 168 is used to set the comparator threshold and, when the signal produced at the output of the amplifier stage 102 exceeds this threshold, the comparator 158 drives the transistor switch 212 (FIG. 3) into conduction to thereby energize the IR photo-transmitter 20 contained within the end cap 18 of the light pen. In that the CRT beam traverses the screen at approximately 17 millisecond intervals (1/60th of a second frame repetition rate), a predetermined series of pulses corresponding to the size of the aperture of field of view of the light pen will be generated at that frequency.

As already mentioned, the entirety of the circuitry of FIG. 2 is contained within a suitable housing 93 affixed to the CRT device with which the light pen is to be used and it includes the photo-detector 112 which is arranged to "see" the entire area in proximity to the face of the CRT screen as defined by the rays in FIG. 4. As such, whenever the light pen is transmitting IR pulses from its transmitter photo-diode 20 with that light pen being in proximity to the face of the CRT, they are reflected back by the aspheric mirror within the light pen's end cap and the detector device 112 will create a shift in the voltage applied to the detector/preamplifier stage 100 and, in the fashion already described, this signal will be amplified stage 102 and applied to an input of the comparator 158 along with a floating reference signal. Assuming that the light intensity reaching the photo-sensor 112 is sufficient to create a signal input to the comparator causing the threshold established for that comparator to be exceeded, a "hit" signal will be developed on the output line 172 from the comparator 158.

The retriggerable one-shot 176 and comparator circuitry 190 serves two purposes: It generates a "pseudo" acquire signal and it masks any false signals generated by the IR receiver circuitry.

The "acquire" signal of a conventional corded light pen is normally generated by a switch-type circuit within the light pen and is not dependent in any form on the production of "hit" signals. The "acquire" signal itself is typically a change in voltage from a normal high, (5 v) inactive, state to an active low (0.4 v) state. The operator activates the acquire switch in prior art light pens to indicate to the computer that the hits currently being generated by the light pen represent valid input and that the computer should now act on this hit data. The cordless pen of the present invention has no provision for an independent "acquire" signal, as the pen itself only generates "hit" signals. However, since this pen is in an off state, generating no hits, until activated, and the pen is only activated when a valid input is intended, the receiver can use the appearance of the "hit" pulse to generate the familiar "acquire" signal. The circuit used to generate this "pseudo" acquire signal uses only one of the retriggerable one-shots in the dual one-shot circuit 176. The first retriggerable one-shot produces an output pulse, of predetermined length, in response to an input trigger pulse. If a second trigger pulse is encountered before the output pulse has terminated, then the output pulse will be extended by another timing period. This output pulse from the retriggerable one-shot can be extended indefinitely if trigger pulses are received at intervals shorter than the output pulse's normal duration. In the "acquire" generation circuit of the present invention, the hit pulses act as trigger inputs. The maximum time between hit pulses is 18 milliseconds, which is the time it takes for a frame to be drawn. The resistor 178 and the capacitor 180 used to set the time constant for the output pulse of the retriggerable one-shot dictate a 24 millisecond output pulse length. Hence, the appearance of "hit" pulses will produce an "acquire" output pulse whose pulse width will not terminate until the hits stop (when the nose 62 is no longer depressed). The complimentary output of the one-shot drives the LED 208 to indicate to the operator that hits are being received and, hence, the pen/receiver system is operational. This is a diagnostic tool to determine system malfunction, usually due to worn batteries.

Although the receiver is designed to be relatively noise free, conditions may exist which can cause it to generate a false "hit" signal. These false hits, if they occur, are usually random, isolated events appearing as a single hit pulse, or a burst of hit pulses extending over a few hundred microseconds. They tend to be non-repetitive events and do not usually occur at regular intervals. Their causes include strong nearby electrostatic discharges, power surges in the supply line, etc. Since the "acquire" signal must accompany the "hit" signal in order for the computer to consider hit inputs to be valid, if the "acquire" circuitry can filter out these false hit events and generate the "acquire" signal only when valid hit data is present, then false receiver hits will be masked. This is accomplished with a retriggerable one-shot of chip 176 and the comparator 190.

The one-shot and comparator act as a filter and enable the acquire generating one-shot in such a way as to mask any random false hits. The false-hit masking one-shot operates in an identical fashion to the acquire generating one-shot. That is, its output changes from high to low and stays low as long as its input is triggered faster than its 24 millisecond output pulse length. The output of the false-hit filter one-shot runs into a resistor capacitor network comprised of resistor 188 and capacitor 189 tied to a comparator input "A". The voltage at the comparator pin drops over a period of several milliseconds as a result of the one-shot pulse changing state. The other pin of the comparator has a threshold provided via resistors 192 and 194. When the voltage level of the comparator drops below its threshold voltage, the comparator 190 output changes state. The comparator output then acts as an enable for the acquire one-shot on chip 176. This change of state of the comparator output occurs several milliseconds after the initial hit trigger pulse has caused the false-hit masking one-shot to generate its output pulse to the comparator input (due to the R/C network 188–189). If the input trigger to the one-shot is a false-hit event, it will usually end before the acquire one-shot is enabled by the comparator. Since the false-hit signal is not likely to be repetitive, it will not trigger the acquire one-shot after it is enabled and, hence, no "acquire" signal will be generated and the false hit will be masked.

The delay can also be generated using another retriggerable one-shot in place of the comparator. In this case, the one-shot receiving the hit pulses would generate a pulse of, say, 10 milliseconds and then change state to its normal (inactive) level. The transistion to its inactive level would then be used to trigger the second one-shot whose output would then enable the acquire one-shot. The effect of this alternative arrangement would be exactly the same as use of the one-shot comparator combination. Note also, that this masking effect can be used to enable a gate for the hit inputs into the computer so that not only the acquire, but the hit inputs, are filtered for false hits.

As can be seen from FIGS. 1 and 4, the optical system is configured to require a minimum of elements and a minimum of energy and to allow the pen 10 to be picked up and used without regard to a proper orientation. Thus, it is not required that the pen be picked up and used only in one position. To achieve this result, a single IR LED 20 generates light which is directed away from the screen 95 of the monitor 94 and from the receiver detector module 93. This IR light impinges upon a special aspheric mirrored surface and is reflected back toward the monitor and receiver detector in a cone-shaped pattern, the apex of the cone being the mirror and the base being described as the monitor face plate plane 95. This cone configuration prevents excessive light from escaping to nearby terminals which could otherwise result in the triggering of their receivers, and also precludes having to aim the LED 20 as would need be the case if it were designed so that its light was to be pointed directly at the monitor. The optical design employed also permits the pen to be picked up and used in any position in that there is no preferred orientation. Also, the pen can be tilted a considerable degree off-axis and still have its light energy picked up by the sensor in the receiver module 93 positioned on the monitor 94.

It can be seen, then, that there is provided by this invention a convenient tool for providing man/machine communication with a computer via the CRT display screen in a fashion that does not require an umbilical connection between the light pen instrument and the computer. The system includes a receiver responsive to electro-magnetic radiation given off by the light pen instrument and the light pen itself which comprises an easy-to-hold and easy-to-operate design. Because the light pen can communicate with the computer without the need for an umbilical cord connecting the two, greater freedom and less operator fatigue result.

While the invention has been described in conjunction with a presently preferred embodiment of the invention, it should be apparent to those skilled in the art that various changes and modifications might be made which should reasonably fall within the gambit of the invention. Hence, the scope of the invention is to be determined by the appended claims.

What is claimed is:
1. A cordless light pen comprising:
 (a) a hollow, generally cylindrical barrel member having a first end and a second end;
 (b) an end cap member secured to said first end of said barrel member, said end cap member being formed from a light energy transmissive material and containing a light source;
 (c) a source of potential and switch means contained within said barrel member, said switch means being operatively coupled to said light source and to said source of potential;
 (d) a tip member reciprocally movable within said barrel member and having a first end portion thereof extending outwardly from said second end of said barrel member and a second portion within said barrel comprising a longitudinally extending light transmitting channel which terminates at the other end of said tip member within said barrel;
 (e) a light sensor disposed adjacent said other end of said tip member proximate said light transmitting channel for producing electrical signals upon receipt of light energy from a source external to said barrel; and
 (f) an electronic circuit containing amplifying means, filtering means and comparator means connectable through said switch means to said source of potential and responsive to said electrical signals for driving said light source when said switch means changes from a normally open condition to a closed condition upon depression of said reciprocally movable tip member.
2. The light pen as in claim 1 and further including:
 (a) frame means insertable into said barrel member for maintaining a predetermined longitudinal spacing between said source of potential and said light sensor; and (b) a substrate having a pattern of printed wiring thereon, said substrate being secured to said frame means and supporting said circuit and said switch means thereon.

3. The light pen as in claim 2 wherein said tip member includes an extension projecting from the first end thereof and said frame means includes guide means for slidingly receiving said extension.

4. The cordless light pen as in claim 3 wherein said switch means comprises first and second magnetic reed switches and wherein the actuating magnet for said magnetic reed switches is affixed to said extension and reciprocally movable therewith relative to said frame means.

5. A cordless light pen comprising:
(a) a generally cylindrical, hollow barrel member having first and second ends;
(b) a tip member mounted for reciprocating movement within said barrel, a portion of said tip member extending outwardly from said first end of said barrel, said tip member containing a light transmitting conduit extending lengthwise from end-to-end of said tip member;
(c) frame means disposed within said barrel having one end thereof adjacent the end of said tip member which is contained within said barrel member;
(d) a photo-sensing element supported by said frame and positioned to receive light energy passing through said conduit;
(e) a printed circuit card having a pattern of conductors formed thereon and supporting electrical components comprising signal amplifying, signal filtering and signal level comparison means;
(f) an electrical energy source contained within said barrel;
(g) a light energy transmitting means located proximate the end of said barrel opposite to said tip member;
(h) first and second switching means operated by the reciprocating movement of said tip member for connecting said electrical energy source to said printed circuit card and for connecting said electrical energy source to said light transmitting means; and
(i) means connected in circuit with said second switching means and with said comparator means for causing said light transmitting means to be energized by light energy of a predetermined intensity traveling through said light transmitting conduit when said tip member is depressed into said barrel member.

6. A cordless light pen system comprising:
(a) a hand-held instrument having a light conducting tip member for picking up light energy emanating from a display screen disposed at one end of said instrument and a light energy transmitting means at the other end of said instrument, said instrument further including
(i) light-to-electrical transducing means coupled to said tip member for producing an electrical signal proportional to the light intensity reaching said transducing means,
(ii) signal processing means coupled to said transducing means for producing an output signal when said electrical signal exceeds a predetermined threshold level, and
(iii) means coupling said output signal to said light energy transmitting means; and
(b) a separate light energy receiving means positioned in the field of view of said light energy transmitting means, said light energy receiving means including
(i) light energy sensing means for receiving light energy from said light energy transmitting means and producing an electrical signal proportional thereto,
(ii) signal amplifying means and filtering means coupled to receive said electrical signal produced by said light energy sensing means,
(iii) comparator means coupled to the output of said amplifying and filtering means for producing a hit signal when said output of said amplifying and filtering means exceeds a predetermined reference level,
(iv) pulse generating means for producing an acquire signal, and
(v) delay means operatively coupled to said pulse generating means and to said comparator means for inhibiting said pulse generating means from producing said acquire signal when said hit signals emanating from said comparator means occur at a rate below a predetermined lower rate limit.

7. The cordless light pen system of claim 6 wherein said pulse generating means comprises a first retriggerable monostable multi-vibrator having its trigger input coupled to the output of said comparator means and its output coupled to said delay means and a second retriggerable monostable multi-vibrator having its enable input connected to the output of said delay means, its trigger input coupled to the output of said comparator means, said acquire signal being obtained at the output of said second retriggerable monostable multi-vibrator.

8. The cordless light pen system of claim 7 wherein said delay means comprises a voltage comparator having first and second input terminals and an output terminal, said first input terminal being connected to a source of reference voltage and said second input terminal being coupled to said output of said first retriggerable monostable multi-vibrator through a resistance/compacitance charging circuit, said output terminal of said voltage comparator being coupled to said enable input of said second retriggerable monostable multi-vibrator.

* * * * *